June 30, 1959 C. H. HILL 2,892,386
POWER DRIVEN WORK-ENGAGING ATTACHMENT FOR TURRET LATHES
Filed Jan. 4, 1954 4 Sheets-Sheet 1

INVENTOR.
Charles H. Hill
BY
ATTORNEY.

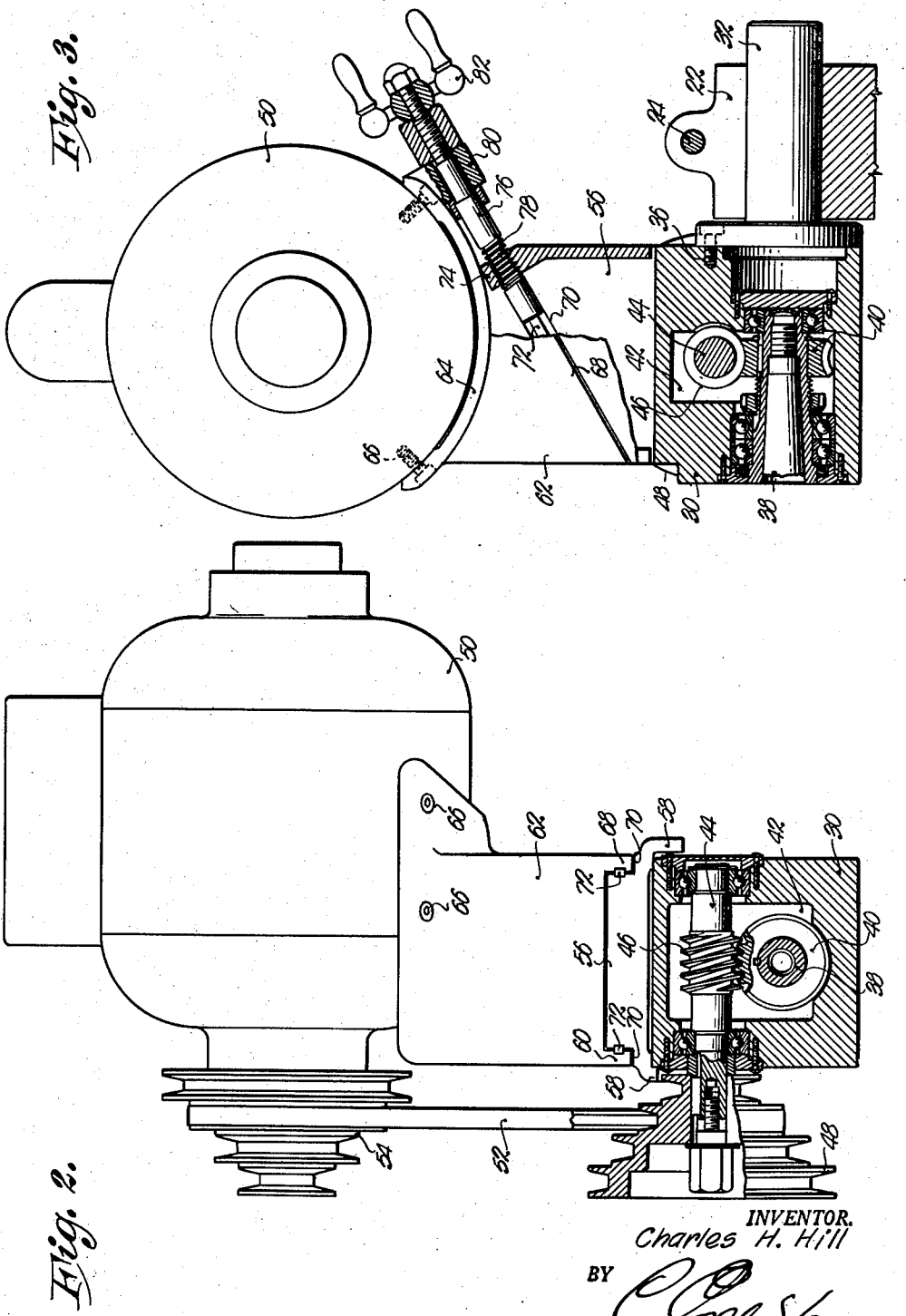

June 30, 1959  C. H. HILL  2,892,386
POWER DRIVEN WORK-ENGAGING ATTACHMENT FOR TURRET LATHES
Filed Jan. 4, 1954  4 Sheets-Sheet 3
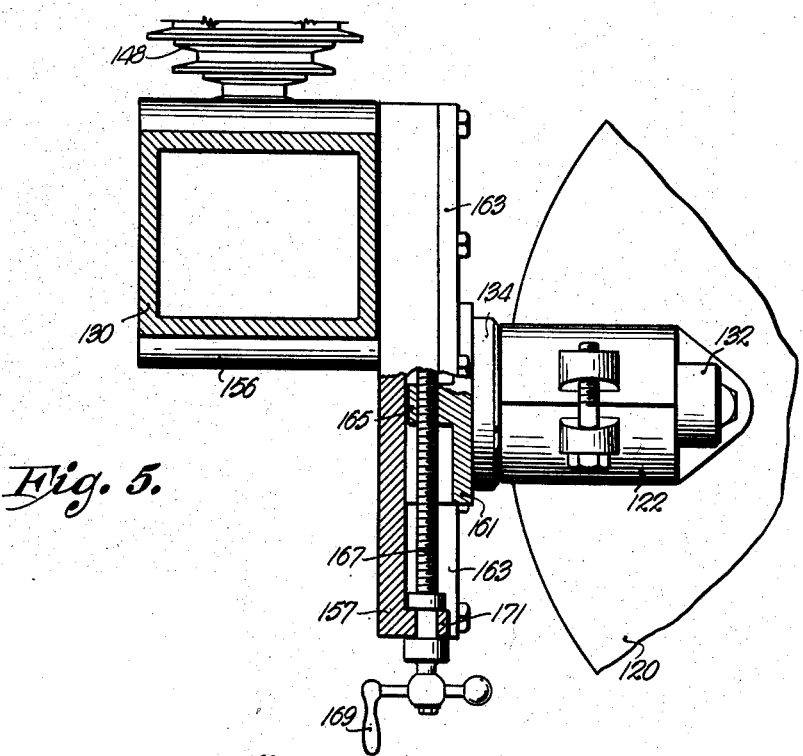
Fig. 5.
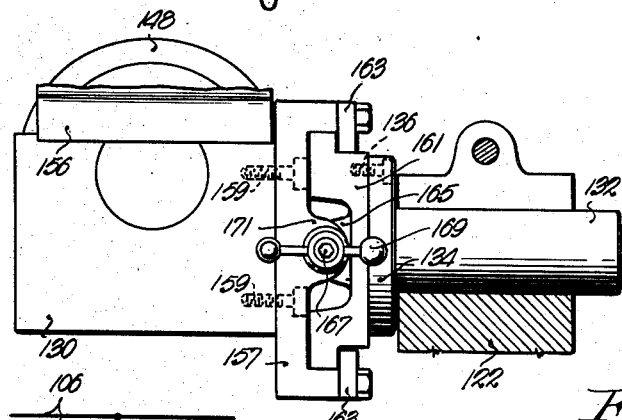
Fig. 6.
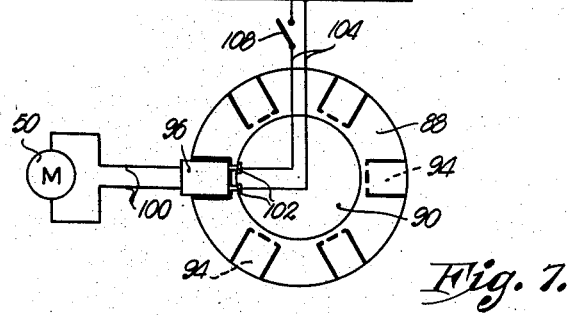
Fig. 7.
INVENTOR.
Charles H. Hill
BY
ATTORNEY.

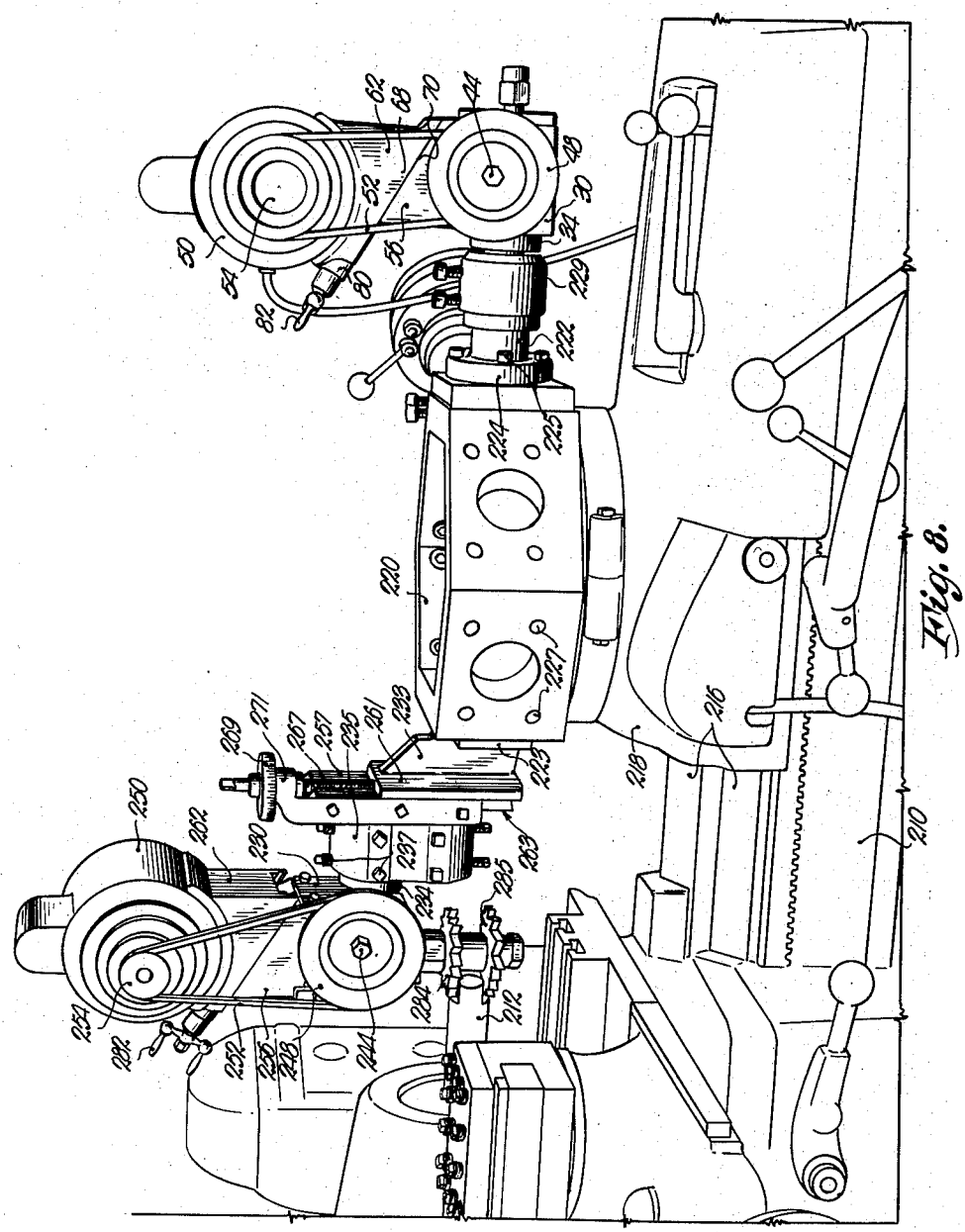

2,892,386

POWER DRIVEN WORK-ENGAGING ATTACHMENT FOR TURRET LATHES

Charles H. Hill, Hutchinson, Kans.

Application January 4, 1954, Serial No. 401,852

1 Claim. (Cl. 90—11)

This invention relates to improvements in machine tools, particularly to that class of machinery that is designed to operably support a cutting tool that may be applied to a workpiece for milling, reaming, turning, drilling, boring, threading or otherwise forming the workpiece, as for example, in a turret lathe.

It is the primary object of the present invention to improve upon turret lathes by the provision of mechanism which may be attached to one of the tool posts of the turret to rotate a tool operably connected therewith with respect to the workpiece whether or not the latter is also rotated relative to the tool.

It is well known that the principle of operation of turret lathes contemplates rotation of the workpiece while the tool is held stationary. The workpiece is normally mounted on a rotatable mandrel through the medium of a chuck or a faceplate, and a plurality of peripherally disposed tools are successively brought into alignment with the workpiece to form a cutting action thereon as the tool is held against movement and while the workpiece is rotated by the mandrel.

Manifestly, many cutting operations may be performed through use of this type of lathe, but since the tools themselves cannot be rotated with respect to the turret upon which they are mounted, many important operations cannot be accomplished.

The most important object of the present invention, therefore, is to extend the use and versatility of turret lathes by the provision of mechanism having its own prime mover operably coupled with a rotating tool, the entire mechanism being adapted for mounting on one of the tool posts of the turret for rotation with the latter.

It is another important object of the present invention to provide in combination with a turret lathe means to permit transverse and/or vertical movement of the attachment with respect to the tool post, thereby adapting the assembly for use with lathes wherein the turret carriage cannot be reciprocated transversely of the lathe bed or raised and lowered relative thereto.

Another important object of the present invention is to provide a power-driven work-engaging tool unit in combination with a turret lathe having novel means for interconnecting the prime mover with a source of electrical energy while permitting rotation of the turret and reciprocation of its carriage either toward and away from the work or transversely of the lathe bed.

Other objects include many important details of construction, all of which will be made clear as the following specification progresses.

In the drawings:

Fig. 2 is a side elevational view of the attachment of Fig. 1 entirely removed from the lathe partially in section to reveal details of construction.

Fig. 3 is an end elevational view of the attachment of Fig. 1 showing the manner of mounting the same on one of the tool posts of the turret, parts being broken away for clearness.

Fig. 5 is a view partially in plan and partially in section, illustrating a modified form of mounting means for securing the attachment of Fig. 1 to one of the tool posts of the turret.

Fig. 6 is an end elevational view of the assembly shown in Fig. 5 partially in section to reveal details of construction.

Fig. 7 is a schematic view and wiring diagram illustrating the manner of electrically connecting the prime mover with the source of energy; and Fig. 8 is a fragmentary, perspective view of another type of turret lathe having the attachment of Fig. 1, together with a modified form of attachment both operably mounted thereon.

Figures 1, 4:
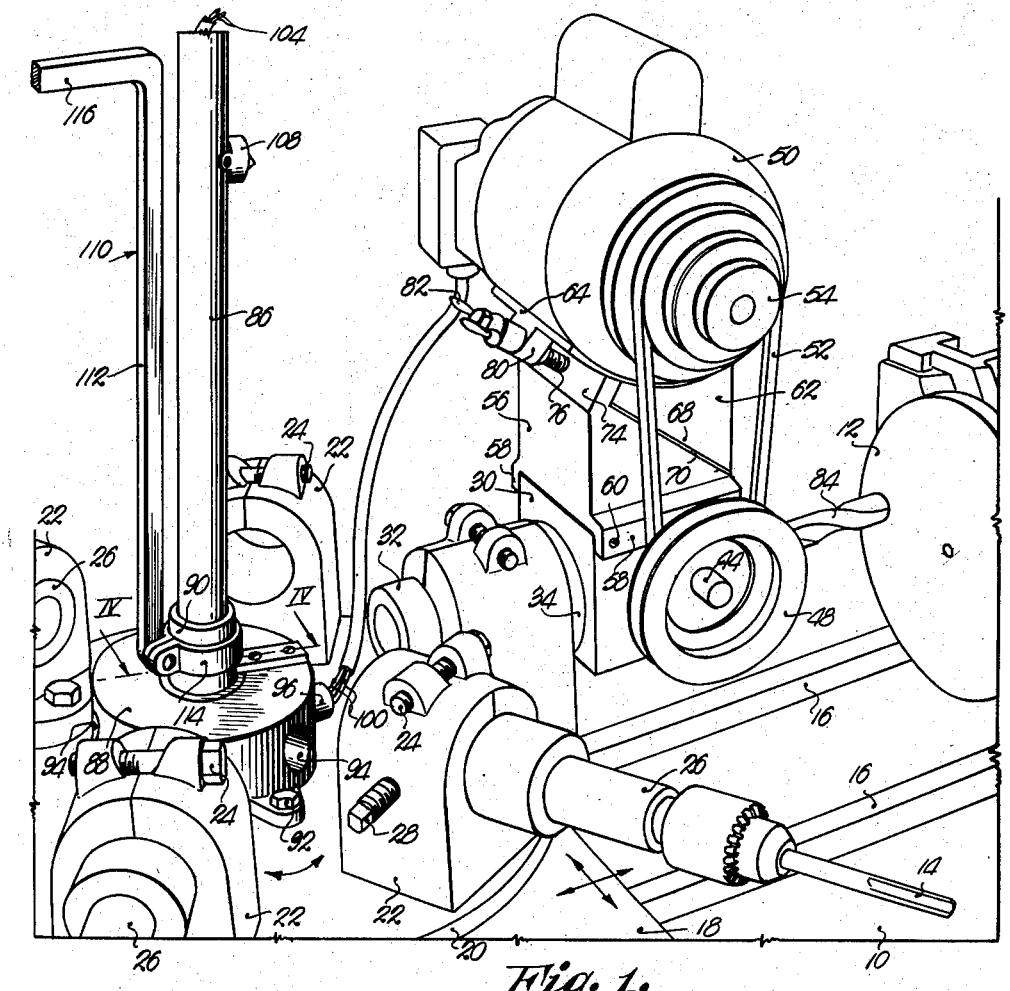
Figure 1 is a fragmentary, perspective view of one type of turret lathe having a power-driven work-engaging attachment made pursuant to one form of the present invention operably mounted thereon.
Fig. 4 is an enlarged, fragmentary, detailed, cross-sectional view taken on line IV—IV of Fig. 1 looking in the direction of the arrows.

One form of turret lathe is illustrated in Fig. 1 of the drawings and includes a bed 10 in the usual manner upon which is operably mounted a rotatable mandrel having a prime mover operably connected therewith. Turret lathes also utilize either a chuck or a faceplate for supporting a workpiece 12, to be formed by a series of cutting tools 14. Inasmuch as the mandrel, its prime mover and the chuck or faceplate form no part of the present invention, they are not illustrated in the drawings.

Turret lathes are normally provided with a carriage (not shown) that is mounted for reciprocation toward and away from the workpiece 12 through the medium of a slide 16. Many turret lathes are additionally provided with a carriage 18 that is mounted for reciprocation transversely of the slide 16 and upon which is rotatably mounted a turret 20. Turret 20 is in turn provided with a plurality of tool posts 22 at its periphery, those illustrated in Fig. 1 being in the nature of clamps having fasteners 24 to releasably hold arbors 26 that mount cutting tools 14. Many tool posts 22 of this nature are additionally provided with setscrews 28 that also engage the arbors 26.

The tools 14 of turret lathes are successively brought into proper alignment with the workpiece 12 upon rotation of the turret 20 on a vertical axis, whereupon the tools 14 are held stationary while the workpiece 12 is rotated.

In accordance with the present invention, structure is provided to substantially increase the versatility of turret lathes and render the same adaptable to perform many operations on workpieces 12 not heretofore made possible by conventional turret construction. The improvements embodying the form of the present invention shown in Figs. 1 to 7 inclusive, include an attachment having a head broadly designated by the numeral 30, mounted on one of the tool posts 22 in any suitable manner. The tool posts 22 chosen for illustration, require the utilization of means such as a pin 32 secured to one vertical face of the head 30 through a disc 34 on the pin 32 and releasably joined to the head 30 by fasteners 36.

The head 30 has a tubular, frusto-conical spindle 38 mounted therein for rotation on an axis in alignment with the longitudinal axis of the pin 32 as shown in Fig. 3 of the drawings, upon which is rigidly mounted a worm gear 40 within a cavity 42 in the head 30.

A shaft 44 extending through the head 30 above the work gear 40, is rotatably carried by the head 30 and provided with a worm 46 in the cavity 42 that is in mesh with the worm gear 40.

A sheave 48 secured to the shaft 44, is operably connected with an electric motor 50 through the medium of an endless belt 52 trained around the sheave 48 and around a second sheave 54 rigid to the drive shaft of the motor 50.

The means for mounting the motor 50 upon the head 30 includes structure for predetermining the tightness of the belt 52. A base member 56 rests upon the upper face of the head 30 and straddles the same by a pair of opposed, down-turned flanges 58. Base 56 is removably attached to the head 30 by a plurality of fasteners 60 passing through the flanges 58.

A motor mount 62 has a cradle 64 supporting the motor 50 and attached thereto through use of fastening elements 66. Motor mount 62 is supported by the base 56 for reciprocable movement relative thereto and has a pair of spaced flanges 68 as shown best in Figs. 2 and 3 which partially embrace the base 56. Base 56 is provided with a pair of inclined edges 70 that directly underlie the longitudinal edges of the flanges 68 which are similarly inclined and the said flanges 68 are slidably interconnected with the base 56 above the edges 70 through the medium of keys 72.

One end wall of the base 56 terminates above the edges 70 in an inclined lip 74 through which extends a screw 76 having screw threads 78 connecting the same with the lip 74. A bracket 80 on the cradle 64 rotatably receives the screw 76 and a handle 82 upon the uppermost end of the screw 76 permits rotation of the latter. It is seen that the longitudinal axis of the screw 76 is aligned with the slide means or keys 72 to the end that, as the handle 82 is turned, motor mount 62 is reciprocated relative to the base 56. This movement of the mount 62 and, therefore, of the motor 50, determines the tautness of endless belt 52.

Any desired type of cutting tool such as at 84, may be secured to the spindle 38 through the medium of an arbor (not shown) fastened therewithin and it is seen that upon energization of the motor 50, the tool 84 will be driven from the sheave 54 through the belt 52, sheave 48, shaft 44, worm 46, worm gear 40 and spindle 38.

A special arrangement is provided to operably couple the prime mover 50 with a source of electrical energy, not shown. An elongated, vertical tube 86, shown in Figs. 1 and 4, has a body 88 of insulating material rotatably mounted thereon and particularly upon a sleeve 90 of insulating material, rigid to the lowermost end of the tube 86. The body 88 is secured to the turret 20 by fasteners 92 for rotation with the turret 20 on its rotative axis. Body 88 has a plurality of peripheral sockets 94, one for each post 22 respectively, each of which is adapted to receive a plug 96 provided with a pair of electrical brushes 98.

The brushes 98 are operably coupled with the motor 50 by a pair of conductors 100. The brushes 98 are in wiping engagement with the sleeve 90 around which they rotate upon rotation of the turret 20 and the body 88 relative to the tube 86 and the sleeve 90. A pair of electrical terminals 102, carried by the sleeve 90, may be connected with said source of electrical energy by a pair of conductors 104 that extend upwardly through the tube 86 and join with power lines 106 as shown in Fig. 7. A manual switch 108 carried by the tube 86 is interposed in one of the conductors 104.

The terminals 102 are disposed for engagement by the brushes 98 when the turret 20 is rotated to a position aligning the tool 84 with the workpiece 12, thereby automatically energizing the motor 50 to rotate the tool 84. It is now apparent that any one or all of the posts 22 may support one of the attachments hereof and that their prime movers as at 50, may be coupled in the electric circuit shown in Fig. 7 by utilization of a corresponding socket 94.

The tube 86 must be held against rotation yet be freely reciprocable toward and away from the workpiece 12, as well as transversely of the slides 16 if the lathe is so adapted for such transverse movement of the turret 20. To this end there is provided a bar, broadly designated by the numeral 110, connecting with the tube 86 and which may connect with the carriage that reciprocates on the slide 16. A portion only of the bar 110 is illustrated in Fig. 1 of the drawings with its leg 112 fastened to the sleeve 90 by a clamp 114. The portion 116 of bar 110 is sufficiently high to clear the prime movers 50 upon rotation of the turret 20 relative to the tube 86 and the bar 110. The conductors 104 extend from the uppermost end of the tube 86 to a point of connection with the power lines 106 and sufficient slack should be provided therein to permit freedom of reciprocation of the turret 20 with respect to the bed 10 toward and away from the workpiece 12 and/or transversely of the bed 10.

The modification of Figs. 5 and 6 of the drawings may be utilized for lathes wherein no transverse movement is provided for the turret with respect to the bed of the lathe. In Figs. 5 and 6 the turret is designated by the numeral 120, the head of the attachment by the numeral 130, the sheave thereof by the numeral 148, and the base that is secured to the head 130 by the numeral 156.

Turret 120 is provided with tool posts 122 adapted to clamp a pin 132 having a disc 134 rigid thereto.

Structure for permitting reciprocation of the attachment relative to the turret 120 on a horizontal axis transversely of the bed of the lathe is interposed in Figs. 5 and 6 between the head 130 and the disc 134. This structure includes an elongated, U-shaped member 157 having a longitudinal axis and secured directly to the head 130 by fasteners 159.

A second member 161 is seated within the member 157 and rigidly secured to the disc 134 by fasteners 136. A pair of opposed bars 163, extending longitudinally of the member 157 and releasably attached thereto, retain the member 161 within the member 157 for reciprocable sliding movement of the latter relative to member 161.

An internally tapped boss 165 on the member 161 receives a screw 167 having a handle 169 on the outermost end thereof. The screw 167 is rotatably fastened to the member 157 by means of a boss 171 through which the screw 167 passes, as shown in Fig. 5.

Manipulation of the handle 169 shifts the member 157 relative to the member 161, and thereby reciprocates the head 130. This action permits positioning of the axis of rotation of a tool such as at 84 carried by the head 130 in parallelism with the axis of rotation of work 12. It is seen that the tool 84 may be maintained in perpendicular relationship to the work 12 and the position of the tool 84 relative to the work 12 may be varied from the axis of rotation of the workpiece 12 radially to its periphery.

By way of example therefore, a plurality of concentric, annular grooves, undercut cavities or the like, may be cut in the workpiece 12, as the tool 84 (or other suitable cutting tool) and the workpiece 12 are both rotated, simply by manipulating the handle 169 each time a new groove is to be cut.

Milling and reaming, in addition to drilling and boring, are important functions of the machine tool as modified through improvements hereinabove set forth. These cutting actions may take place either on the center of spindle rotation or at any point off center throughout full swing of the turret lathe, accomplished either by the cross feed dovetail slide shown in Figs. 5 and 6, or by use of a cross-sliding turret on lathes so equipped. One particular operation is the milling of circular T-slots or thread milling.

Further, it is to be understood that the heads 30 and 130 may be equipped with many tools other than that illustrated in Fig. 1 and designated by the numeral 84, such as a grinder head, universal milling head, and other accessories, depending upon the particular cutting operation that is to take place on the workpiece.

In Fig. 8 of the drawings there is shown another type of turret lathe having a bed 210 upon which is operably mounted a mandrel supporting a workpiece 212 to be cut through use of cutting tools 284 and 285. A carriage 218 is mounted for reciprocation toward and away from workpiece 212 by means of a slide 216 on bed 210, and a turret 220 is rotatably mounted on the carriage 218. Turret 220 is in turn provided with a plurality of tool posts at its periphery, including plates 223 and 224 mounted by means of fasteners 225 engaging in tapped openings 227. The attachment of Fig. 1 is shown mounted on turret 220 through use of post 222 having a collar 229 coupling pin 32 of disc 34 thereto.

The attachment embodying the modified form of the invention has a head 230 provided with mechanism such as is detailed in Figs. 2 and 3 for supporting and driving tools 284 and 285 on a vertical axis upon rotation of shaft 244. A prime mover 250 provided with a sheave 254 has connection with sheave 248 on shaft 244 by means of a belt 252. Mount 262 for motor 250 may be shifted relative to base 256 upon manipulation of handle 282, and base 256 is secured to head 230, all in the same manner as above described with respect to Figs. 1 to 7 inclusive.

Structure for permitting reciprocation of the attachment carried by plate 223, on a vertical axis, is similar to that shown in Figs. 5 and 6. An elongated member 257 has a second member 261 seated therewithin. A dovetail slide 263 interconnects the members 257 and 261 for reciprocation of the member 257 relative to member 261. A web-like post 233 rigidly connects member 261 with plate 223.

A screw 267 rotatably carried by a boss 271 rigid to member 257 has screw-threaded engagement with member 261, and by manipulation of handle 269 on screw 267, member 257 may be raised or lowered.

Disc 234 on head 230 has a pin (not shown) similar to pin 132 in Figs. 5 and 6 which extends into a tubular body 235 rigid to member 257 and provided with set-screws 237 for holding such pin in place. If desired the structure shown in Figs. 5 and 6 may also be interposed between head 230 and plate 223 to permit transverse movement of the attachment.

Cutters 284 and 285 are shown straddling shaft or workpiece 212, milling wrench flats thereon. All other types of milling cutters may be used such as end mills, surface mills, keyway cutters and the like.

Motor mounts 62 and 262 are reversible and it is noted that handle 282 faces away from turret 220 whereas handle 82 is disposed between turret 220 and mount 62. Mount 262 is moved away from turret 220 to tighten belt 252 whereas mount 62 is moved toward turret 220 to tighten belt 52. Sheave 248 may be mounted on either side of head 230 thereby providing for work clearance when necessary and avoid interference with other tools that may be used on turret 220. Since heads 30, 130 and 230 are all adapted to receive tools for rotation either on a horizontal axis or a vertical axis, the use of the self-powered attachments of this invention is appreciably increased.

It is now seen that the use of metalworking tools, particularly turret lathes, when supplied with the improvements hereof, may be appreciably extended, and while many individual elements of construction have necessarily been explained in detail, it is to be understood that the same have been brought together in combination in a novel manner to produce new and advantageous results.

It is, therefore, desired to be limited only by the spirit of the invention as defined by the scope of the appended claim.

Having thus described the invention what is claimed as new and desired to be secured by Letters Patent is:

In a turret lathe having a bed, a headstock secured to the bed, a turret carriage, a slide supporting the carriage on the bed for reciprocation toward and away from the headstock, and a turret rotatably mounted on the carriage and provided with a series of tool supports surrounding its axis of rotation, the combination with the turret of a plurality of attachments, each mounted on one of the supports for rotation with the turret and including a rotatable tool, an electrically operated prime mover and structure coupling the prime mover with the tool for rotating the latter upon energization of said prime mover; an elongated, upright tube disposed on the axis of rotation of the turret and rigidly secured to the latter; a sleeve of nonconductive material rigid to the lowermost end of the tube; a body of nonconductive material rotatable about said sleeve, said body having a plurality of sockets formed therein; means securing the body to the turret for rotation therewith on said axis of rotation of the turret; a pair of terminals within said sleeve in opposed alignment with the headstock, said terminals being adapted to selectively communicate with said sockets; an electrical conductor connected to the terminals and extending upwardly through the tube; a plug for each attachment respectively, each of said plugs being insertable into a socket when its respective attachment is in position; conduit means connecting each of said plugs with the prime mover on a corresponding attachment; and brushes on each of said plugs engageable with the terminals when the plug is inserted in a socket whereby to energize the prime mover on one of the attachments when the latter has been rotated to a position with the tool thereon in operable alignment with the headstock.

References Cited in the file of this patent

UNITED STATES PATENTS

| | | |
|---|---|---|
| 1,604,030 | Ewen | Oct. 19, 1926 |
| 1,856,846 | Duncan | May 3, 1932 |
| 1,908,974 | Garrison | May 16, 1933 |
| 2,408,469 | Malloy | Oct. 1, 1946 |
| 2,423,696 | Fink | July 8, 1947 |
| 2,497,735 | McCullough | Feb. 14, 1950 |
| 2,523,573 | Jernegan | Sept. 26, 1950 |
| 2,619,880 | Hosea | Dec. 2, 1952 |
| 2,696,535 | McLean et al. | Dec. 7, 1954 |
| 2,767,598 | Burg | Oct. 23, 1956 |

FOREIGN PATENTS

| | | |
|---|---|---|
| 360,547 | France | Apr. 25, 1906 |